United States Patent [19]

Cleary et al.

[11] E Re. 30,295

[45] Reissued Jun. 3, 1980

[54] CONTROLLED DURATION SWITCH

[76] Inventors: John M. Cleary, 426 Washington Valley Rd., Martinsville, N.J. 08836; John P. Mohrhuaser, 7 Washington Ave., Avon-by-the-Sea, N.J. 07717

[21] Appl. No.: 881,840

[22] Filed: Feb. 27, 1978

Related U.S. Patent Documents

Reissue of:

[64] Patent No.: 4,015,139
Issued: Mar. 29, 1977
Appl. No.: 574,955
Filed: May 6, 1975

[51] Int. Cl.[2] ..... H01H 43/00
[52] U.S. Cl. ..... 307/141; 200/33 R
[58] Field of Search ..... 200/33 R, 33 A, 183, 200/184, 185, 186; 307/135, 141, 141.4, 141.8; 315/360

[56] References Cited

U.S. PATENT DOCUMENTS

| | | | |
|---|---|---|---|
| 2,319,349 | 5/1943 | Safford | 200/33 A X |
| 2,843,111 | 7/1958 | Roll | 315/360 X |
| 2,899,518 | 8/1959 | Moore | 200/84 C |
| 3,603,807 | 9/1971 | Erdmann | 307/141 |
| 3,714,457 | 1/1973 | Sweeney | 307/141 |
| 3,819,885 | 6/1974 | Moroto et al. | 200/33 P X |
| 3,828,224 | 8/1974 | Hulshizer | 200/33 R X |
| 3,879,332 | 4/1975 | Leone | 307/141 X |
| 3,889,132 | 6/1975 | Vreeland | 200/33 R X |

*Primary Examiner*—James R. Scott
*Attorney, Agent, or Firm*—George E. Kersey

[57] ABSTRACT

Switches of the kind formed by a controller with an actuator which is automatically restored to its "off" position at the end of a prescribed time interval and provides an indication shortly before the end of the interval. The controller may be manually energized or motor driven.

16 Claims, 18 Drawing Figures

FIG. 8A
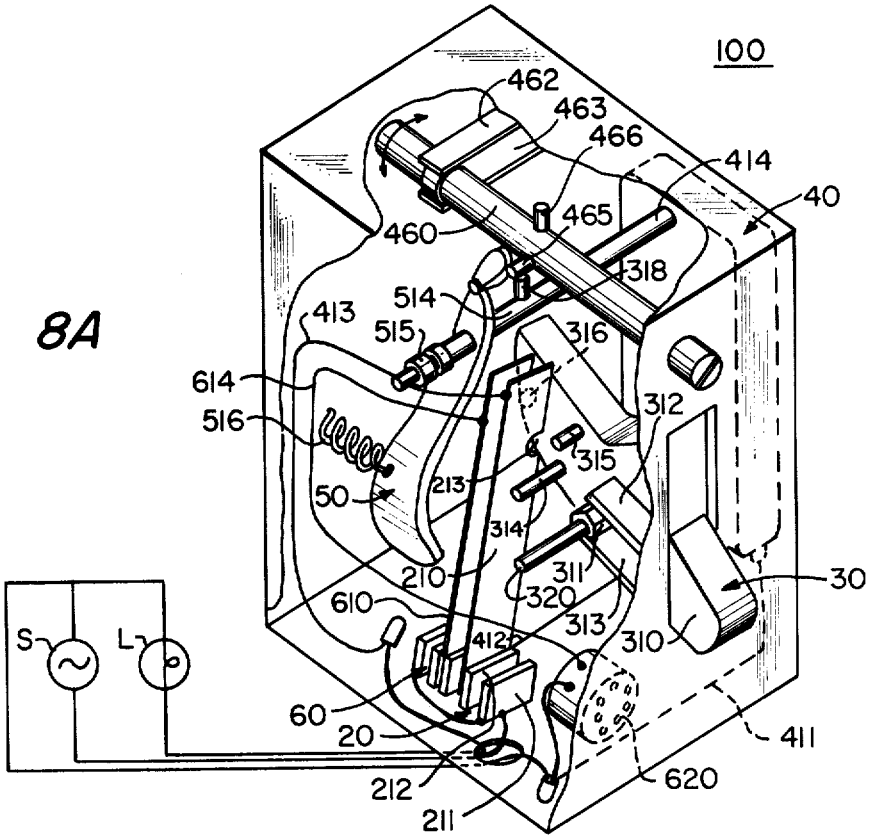
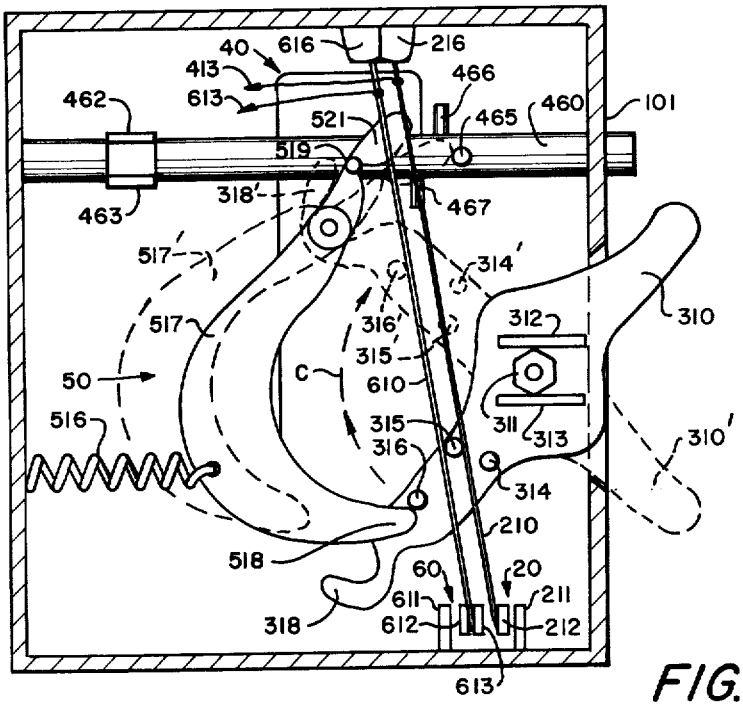
FIG. 8B

CONTROLLED DURATION SWITCH

Matter enclosed in heavy brackets [ ] appears in the original patent but forms no part of this reissue specification; matter printed in italics indicates the additions made by reissue.

BACKGROUND OF THE INVENTION

This invention relates to switches and, more particularly, to switches for lights and individual appliances.

Switches are commonly employed to control energy applied to devices. The typical switch has an actuator, such as a manual toggle, with distinctive "on" and "off" positions. Once the switch is turned on, it typically remains in that condition until someone turns it off.

Unfortunately, switches are often left on long after there is any need for the devices they control. This is particularly true for lights and small appliances. It may be due to forgetfulness, but more frequently it is because the user has moved from the location of the switch and it is no longer convenient for him to turn it off.

Accordingly, it is an object of the invention to provide for the automatic turn off of switch actuators that have been left on inadvertently. A related object is to provide for the automatic turn off of actuators that take the form of toggles.

Another object of the invention is to provide for the automatic turn off of household switches. A related object is to achieve automatic turn off in switch boxes used for household switching.

Still another object is to provide automatic or manual turn off at the option of the user. A companion object is to permit the reactivation of an automatic turn off switch at any time during the operating cycle of the switch.

A further object of the invention is to provide an indication that a switch is about to be turned off automatically.

SUMMARY OF THE INVENTION

In accomplishing the foregoing and related objects, the invention provides for the automatic deactivation of a switch actuator at the end of a prescribed time interval. The actuator has distinctive on and off position corresponding to respective operated and nonoperated conditions of the switch. The actuator is deactivated when it is returned to its off position.

The prescribed time interval during which the switch is activated is established by an actuator operated controller, which can be implemented in a wide variety of mechanical and electrical ways. The controller may be energized mechanically, or it may be motor driven.

In accordance with one aspect of the invention, the controller operates an indicator before the end of the prescribed time interval to signal that automatic deactivation of the actuator is about to take place. The indication may be mechanical, electrical or acoustical.

DESCRIPTION OF THE DRAWINGS

Other aspects of the invention will become apparent after considering several illustrative embodiments, taken in conjunction with the drawings in which:

FIG. 8A is a perspective view of a motor driven embodiment of the invention;

FIG. 8B is a partial sectional view of the embodiment of FIG. 8A;

DETAILED DESCRIPTION

Figure 1:
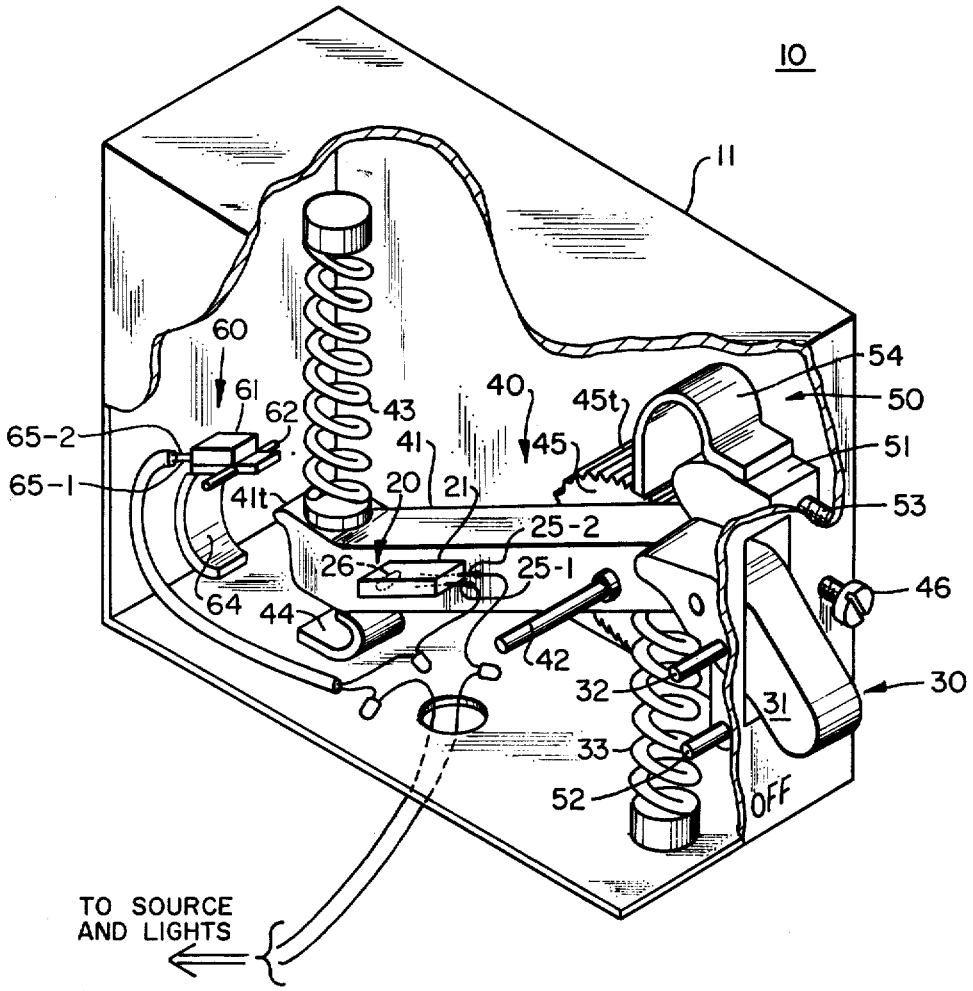
FIG. 1 is a perspective view of a switch in accordance with the invention in its off condition.

Turning to the drawings, a controlled duration switch 10 in accordance with the invention is shown in FIG. 1.

The switch 10 is illustratively encased in a housing 11 that can be accommodated by the kind of wall receptacle commonly used to control household lights. The principal operating constituents of the switch 10 are an auxiliary switch 20, an actuator 30, a controller 40 and a deactuator 50.

The illustrative actuator 30 in FIG. 1 is in the form of a toggle 31 that is pivotable about a pin 32 which is either fixed to the toggle and journalled in opposite side walls of the housing 11, or is fixed to the side walls and journalled in the toggle. Acting upon the toggle 31 is a compression spring 33. Included in the toggle is a guide pin 34 that extends into the deactuator 50.

Forming the illustrative controller 40 of FIG. 1 is a control lever or bar 41 that is mounted for pivotal with respect to a pin 42. One end of the bar 41 is engagable by the toggle 31; the other end is in contact on opposite sides with respective coil and leaf springs 43 and 44. The particular controller 40 of FIG. 1 also includes a regulator 45, which determines the operating interval of the controller. The duration of the operating interval is adjustable by a screw 46.

To form the deactivator 50, an arm 51 is pivoted at one end about a shaft 52, which, like the similar pins 32 and 42, extends to opposite side walls of the casing 11. The other end of the arm 51 engages a compression spring 53 and has a spring extension 54. The latter is engagable with ratchet teeth 45t of the regulator 45.

Acting in concert, the actuator 30, the controller 40 and the deactuator 50 bring about the activation and subsequent, automatic deactivation of the auxiliary switch 20.

In the particular embodiment of FIG. 1, the switch 20 is mounted on the arm 41 of the controller 40. Other forms of mounting and kinds of switch may be employed as well. The illustrative switch 20 is of the well known mercury type with a housing 21, contacts 25-1 and 25-2, and a pool of mercury 26. It will be apparent that when the actuator 30 causes the far end of the controller arm 41 to pivot upwardly about the axis 42, and adopting the final position shown in FIG. 2, the mercury pool flows downwardly in the housing 21 to engage and close the contacts 25-1 and 25-2.

The controlled switch 10 also includes a second auxiliary switch 60, illustratively similar to the first auxiliary switch 20. The second auxiliary switch 60 provides an indication shortly before the end of the controller time interval. It includes a platform 61 that is pivotable on a pin 62 and rests against a leaf spring 64. In FIG. 1, a mercury pool 66 is against contacts 65-1 and 65-2 until the tip 41t of the arm 41 causes the housing to tilt forward on the return stroke and the mercury pool to disengage and open the contacts 65-1 and 65-2.

In the position shown in FIG. 1 the contacts 65-1 and 65-2 of the second auxiliary switch 60 are closed and are in series with the contact 25-1 and 25-2 of the first auxiliary switch 20. Leads from the series connected switch extend to an outside source and device to be switched.

Figure 2:
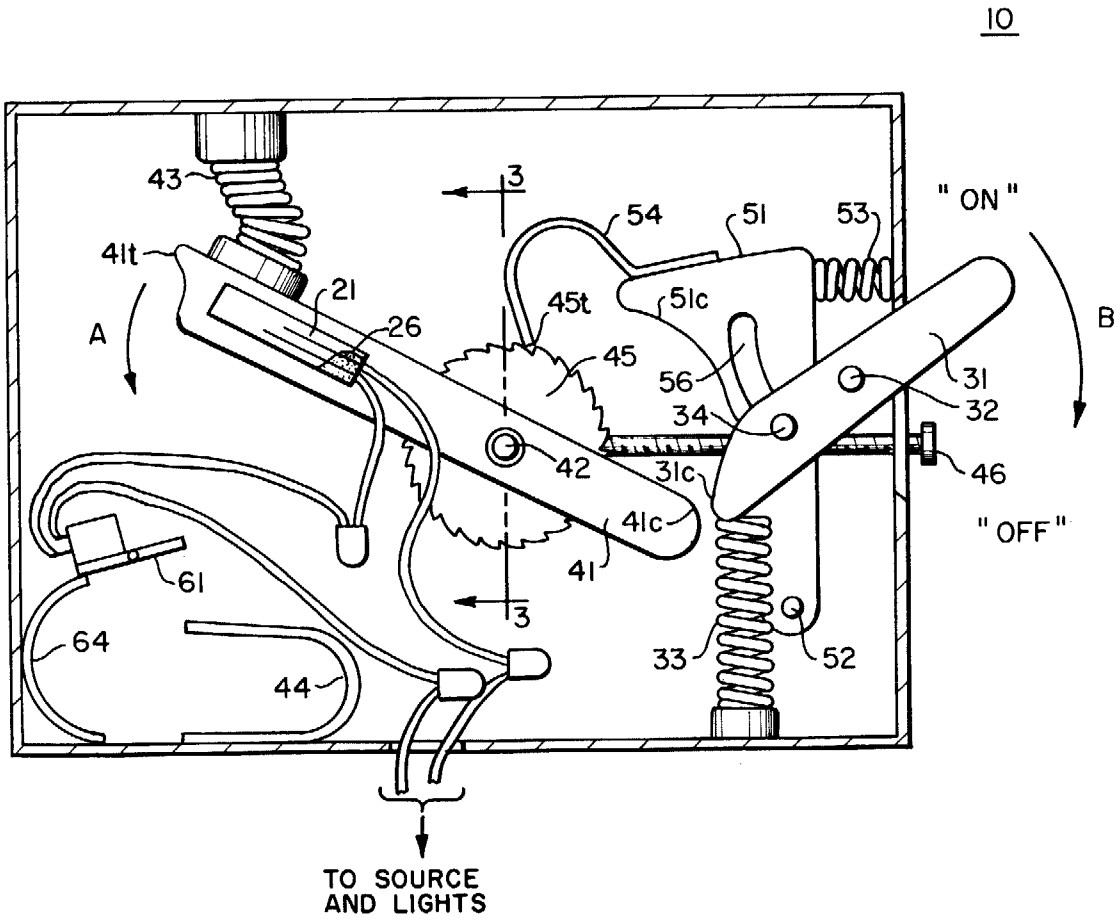
FIG. 2 is a side view of the switch of FIG. 1 in its operated or on condition.

FIG. 2 shows the various positions adopted by the components of the overall switch 10 when the toggle 31 is moved from its off position to its on position.

As the toggle 31 moves about its pivot 32, its cam surface 31c engages the arm 41 and causes it to pivot upwardly, compressing the spring 43. At the same time the movement of the toggle pin 34 in a slot 56 of the deactuator arm 51 permits the latter to move counterclockwise under pressure from its associated spring 53. This causes the tip of the extension spring 54 to engage the teeth 45t and hold the regulator 45 against movement despite the force exerted by the spring 43.

Because of the regulator effect of the unit 45, as explained below, the arm is able to move downward, in the direction indicated by the arrow A at a regulated rate. Initially, the mercury 26 in the switch 21 maintains the contacts closed, so that the light controlled by the switch is illuminated. When the tip 41t of the arm 41 reaches the second auxiliary switch, it tilts forward and causes the mercury to flow forward and momentarily open the formerly closed contacts in series with the light and the first auxiliary switch 20. This turns off the light momentarily and serves to indicate that the light is about to be turned off. As an alternative to having the second auxiliary switch as a momentary open circuit, a resistor (not shown) may be shunted across its terminals. Then when the auxiliary switch is operated, the resistor is unshorted and acts to dim the lights, again providing the desired indication.

After the tip of the arm 41 has operated the second auxiliary switch 20, its cam surface 41c engages the mating cam surface 51c of the deactuator 51, compressing the spring 53, disengaging the end of the spring 54 from the regulator 45 and causing the toggle 31 to move downwardly towards its off position, as indicated by the second arrow B. The spring 33 causes the end 31c against and above the mating surface 41c, causing the other end of the arm 41 to flex the associated spring 44. At the end of the movement, the toggle 31 has been deactivated and is in the position depicted in FIG. 1.

The time interval of the controller 40 is adjusted by the adjusting screw 46, which moves the pivot 42.

As the pivot 42 is moved away from the toggle the prescribed time interval gets shorter; conversely, it gets longer as the pivot 42 is drawn towards the toggle 31.

Figure 3A:
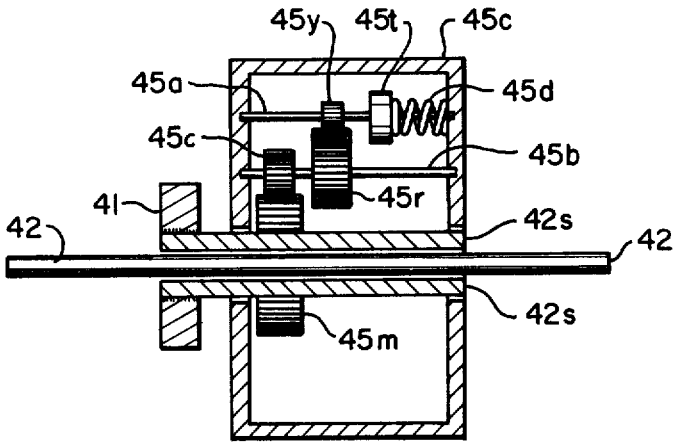
FIG. 3A is a sectional view of the regulator portion of the controller of FIG. 2.

An illustrative regulator 45 is shown in FIG. 3A. The regulator is an escapement contained in a case 45c, which is geared to a sleeve bearing 42s for the pivot shaft 42. The sleeve bearing 42s is in turn joined to the arm 41. When the arm 41 is under pressure as shown in FIG. 2, it is permitted to rotate downwardly at a controlled rate by the escapement.

Forming the escapement are a torsion pendulum 45t, with its associated spring 45d, and a yoke 45y on a shaft 45a. The yoke acts against a regulator gear 45r, which is coaxial on a shaft 45b, with a reduction gear 45c for a main gear 45m on the sleve 42s.

Figure 3B:
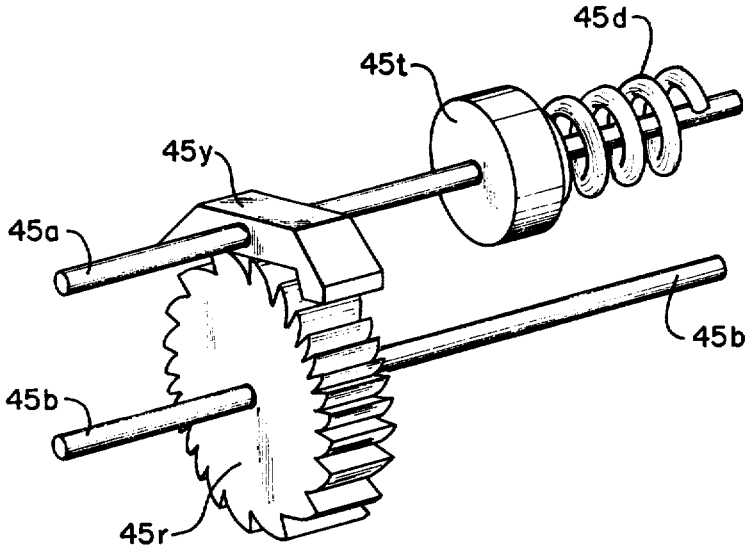
FIG. 3B is a perspective view of a portion of the regulator of FIG. 3A.

Details of the yoke 45y, the torsion pendulum 45t and the regulator gear 45r are shown in FIG. 3B. As the spring 43 tries to force the arm 41 downwards, the yoke 45y rocks against the regulator gear 45r and controls the rate of descent of the arm 41.

Figure 4A:
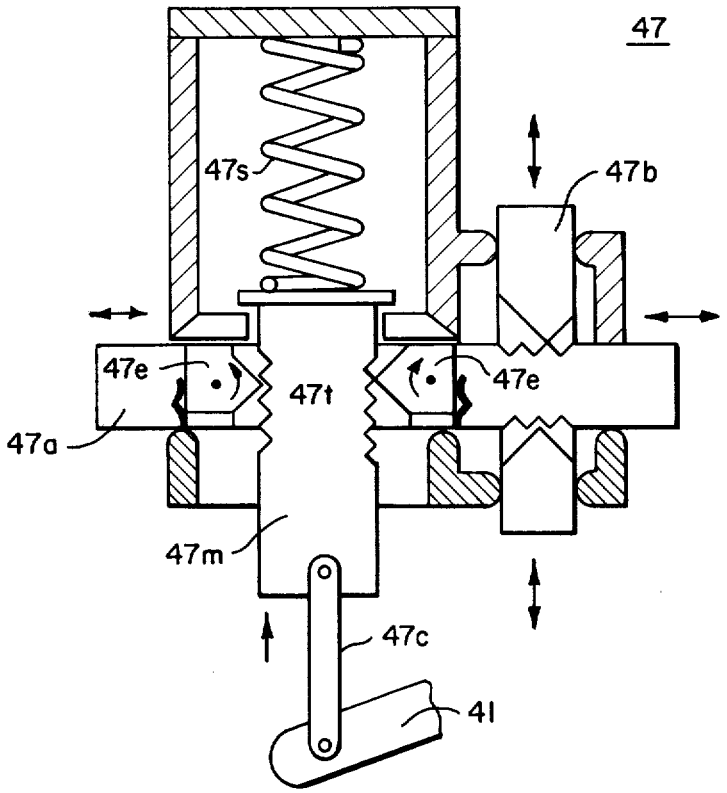
FIGS. 4A through 4C are alternative embodiments for the regulator of FIG. 3A.
Figure 4B:
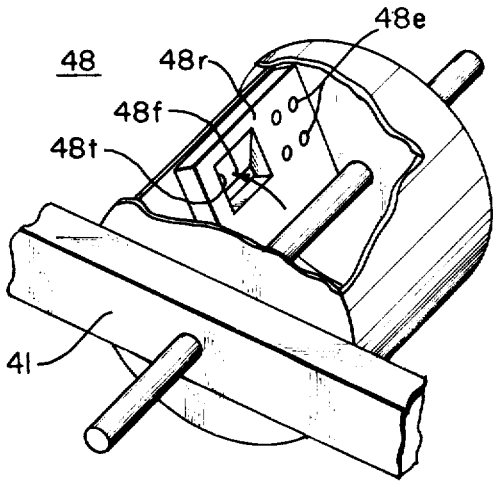
Figure 4C:
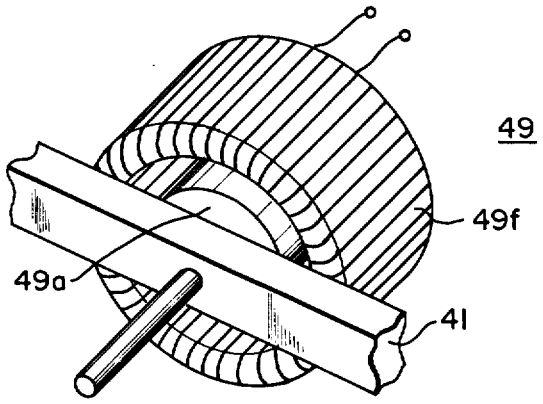

Other regulators may be employed as illustrated in FIGS. 4A through 4C. FIG. 4A shows a friction escapement 47 in which a spring 47s is compressed during the operation of a member, such as the arm 41, through a bell crank 47c. In this usage, the regulator 47 is substituted for the spring 43 in the embodiment of FIG. 1 and the regulator 45 is eliminated. This forces a member 47m against a slide 47a that moves back and forth at a controlled rate because of the teeth 47t. The slide 47a has spring loaded and upwardly pivotable escapement teeth 47e. A second slide 47b, similar to the first, provides additional control.

Another regulator 48 is shown in FIG. 4B in the form of a liquid filled dashpot. The dashpot includes vanes 48v and escape trap 48t that permit fluid 48f to move freely during spring compression by a member 41, but at a controlled rate subsequently through port 48e.

An electrical regulator 49 is shown in FIG. 4C. This regulator has a permanent magnet armature 49a and a field winding 49f that is energized when a switch is closed, such as the first auxiliary switch 20 in FIG. 1.

The field tries to force the armature 49a to turn, but the counter force exerted by the spring 43 against the arm 41 overcomes the field effect and the arm 41 rotates, as before, at a controlled rate.

Figure 5A:
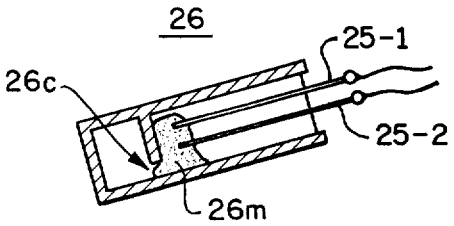
FIGS. 5A through 5C are alternative auxiliary switches for the embodiment of FIG. 2.
Figure 5B:
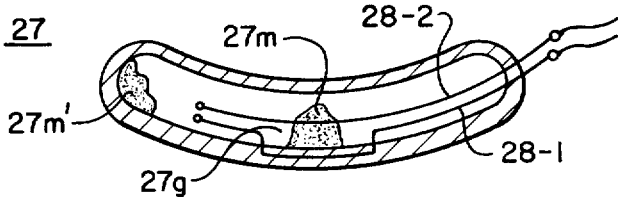
Figure 5C:
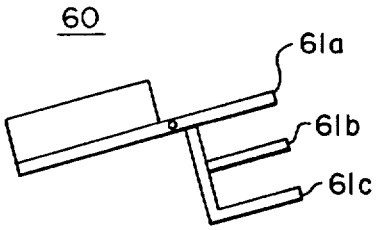

FIGS. 5A through 5C show alternative switches. In FIG. 5A the switch 26 includes a constriction 26c which permits the switch to be reactivated without producing an open circuit. This is because of the delay in the flow of the mercury 26m produced by the constriction; so that when the switch is oriented for what would be the open circuit condition in the absence of the constriction, it can be reset before the mercury is able to flow away from the contacts 25-1 and 25-2.

FIG. 5B, the switch 27 produces an open circuit indication without requiring an additional switch. This is accomplished by providing an interior gap 27g in one of the contacts 28-1. As a result the switch opens momentarily when the mercury 27m reaches the gap 27g, and thereafter opens when the mercury reaches the end of its travel at 27m'.

The switch 60' of FIG. 5C permits multiple tripping, to provide a succession of indications that operation is about to terminate. When installed in the embodiment of FIG. 2, for example, the tip 41t of the rod 41 makes successive contact with platform ends 61a, 61b and 61c, producing an indication each time.

Figure 6:
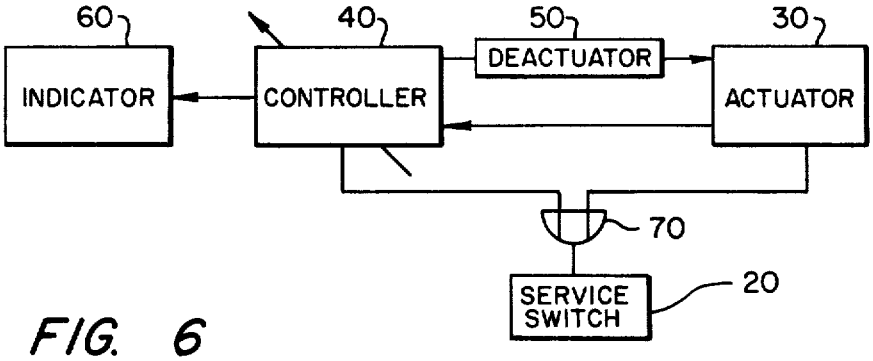
FIG. 6 is a block diagram of a switch unit in accordance with the invention.

A block diagram summarizing a controlled duration switch in accordance with the invention is set forth in FIG. 6. An auxiliary service switch 20 is initially operated directly or indirectly by the actuator 30, for example, through the controller 40. This operation is symbolized by an OR gate 70. At the end of a prescribed and adjustable time interval, the controller operates the deactuator 50 which restores the actuator 30 to its initial condition. In addition the controller 40 causes operation of an auxiliary indicator switch 60 before the end of the prescribed time interval. The auxiliary indicator 60 may be incorporated in or act in conjunction with the auxiliary service switch 20.

Figure 7:
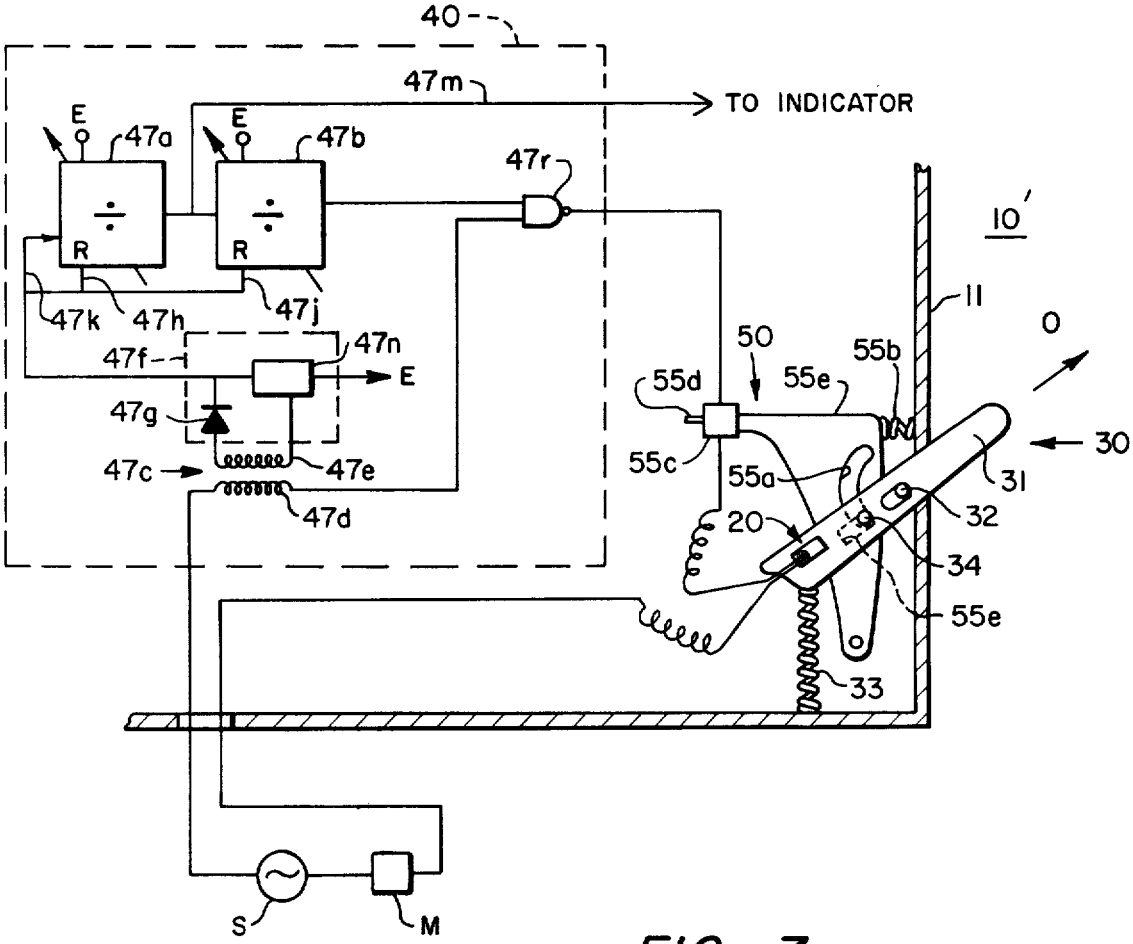
FIG. 7 is a wiring and schematic diagram of an alternative embodiment of the invention employing a completely electrical controller.

The circuitry of FIG. 6 can be implemented with an electronic controller 40 in a switch 10' as shown in FIG. 7. In addition the switch 10' of FIG. 7 includes the auxiliary service switch 20 on the actuator 30, instead of the controller, as in FIGS. 1 and 2.

The electronic controller 40 is formed by cascaded variable count dividers 47a and 47b which are operated from a transformer 47c. When the actuator 30 is switched to the on position shown in FIG. 7, a circuit from a source S is closed to a machine M. This energizes the primary 47d of the transformer 47c and produces a suitable voltage in the secondary 47e. The secondary voltage is rectified and filtered in a unit 47f which contains, for example, a diode rectifier 47g and a conventional filter 47n. The initial transient output of the diode 47g resets the dividers 47a and 47b over lines 47h and 47j and triggers the first divider 47a over line 47k. The filter 47n acts as the power supply of the dividers 47a and 47b. For proper synchronization of operation, suitable delay may be introduced into the reset and trigger lines 47h, 47k and 47j.

When the first divider 47a reaches a count corresponding to a time near the end of the controlled duration interval, a signal appears on an indicator line 47m, which, for example, may operate an acoustical sounder (not shown) to provide the desired warning that the machine M is about to be open circuited from its source S. This gives the operator an opportunity to re-activate the actuator 30 and commence another controlled duration interval.

The deactuator 50 in FIG. 7 has the inverse operation of the deactuator in FIG. 2. Because of the curvature of slot 55a, the spring 55b is compressed when the actuator 30 is in its on position. The compression of the spring 55b is maintained by the holding action of a coil 55c against a plunger extension 55d of the arm 55e.

The coil 55c is energized when the switch 20 is operated. At the end of the controlled duration interval, the output from the second divider 47b terminates the output of a NOR gate 47r that appeared when the switch 20 was closed.

The various electronic components of the dividers 47a and 47b, and the gate 47r are desirably integrated circuits of standard configuration. In addition, the deactuator may be implemented in a number of other ways, including the use of a pawl and ratchet, with the pawl being disengaged from the ratchet, by a relay that is operable from the controller 40.

The toggle may be locked in its on position by being pulled out in the direction of the arrow O to lock the pin 34 in the recess 560r of the slot 560. It will be apparent that the lock mechanism may be implemented in other ways.

A motorized embodiment of the invention is shown in FIG. 8A. The switch unit 100 has the same principal operating constituents summarized by the block diagram of FIG. 6. Accordingly, there is an auxiliary switch 20, pivoted actuator 30, a controller 40 and a deactuator 50. The controller 40, however, is motorized instead of being manually energized.

The actuator 30 is formed by a toggle 310 that is pivotable about a pin 320. The motion of the toggle 310 is regulated by a square boss 311 and its associated leaf springs 312 and 313. The latter may be fixed to the front wall of the receptacle and provide a snap action when the toggle is switched from its off. or downward position to its on or upward position. The toggle 310 also includes cam members 314, 315 and 316, in the form of cylindrical projections.

When the toggle 310 is in its off or downward position as shown in FIG. 8A, the cam member 314 bears against leaf 210 of the service switch 20 and keeps contacts 211 and 212 open. When the toggle 310 is pivoted upwardly to its on position, the contacts 211 and 212 close and the second cam 315 moves through a notch 213 in the leaf contactor spring 210 against a leaf contactor spring 610 of a second auxiliary switch 60. The leaf switch 20 and 60 are incompletely shown and it will be understood that they may be secured within the receptacle in any conventional way.

In the embodiment of FIG. 8A a hooked end 318 of the toggle is illustratively interposed between a shaft 414 of the controller and a similar shaft 514 of the deactuator. This provides assurance that the deactuator will not operate when the toggle 310 is down, as well as facilitating a resetting of the deactuator at the end of a switch interval.

When the toggle 310 is switched to its upward position, the hook 318 is withdrawn and because of the suitable serration of shaft ends and the deactuator spring 515, the controller shaft 414 is able to mesh with the end of the deactuator shaft 514. Because of the direct lead 411 and closure of switch 20, the controller 40 is energized through the switch 20 over leads 412 and 413, causing the deactuator 50 to rotate through a counterclockwise arc about the combined controller and deactuator shafts 414 and 514, and against the restraint of a spring 516.

The actual operation of the deactuator will be clear from the explanation below of FIG. 8B.

Also shown in FIG. 8A is regulator 460. It has snap springs 462 and 463 similar to the springs 312 and 313 of the toggle 310. In addition the regulator has control cams such as 465 and 466 whose operation is explained below.

The auxiliary switch 60 is used to operate an alarm, for example, a buzzer 620 over line 614 before the toggle 310 is deactuated, also explained below.

Turning to FIG. 8B, the toggle 310 is shown in its operated or on position, having been moved upwardly from its off position, 310' shown in phantom. The arm 517 of the deactuator 50 is shown in an intermediate position, having been rotated in a counterclockwise direction from the phantom position 517' by the operation of the motorized controller 40.

A suitable unit for the controller 40 is the 125 volts, 60 cycle, 3 watt unit manufactured by International Register Co. as Model No. WG-560.

As indicated in FIG. 8B, the arm 517, at its intermediate position, is in engagement with the cam 316 of the toggle 310. Further operation of the controller 40 causes the toggle 310 to rotate in a clockwise direction indicated by the dashed-line path C. The snap action afforded by the leaf springs 312 and 313 accentuates attainment of the return position 310'. As the tip 518 moves against one cam 316, the other cam 315 for the auxiliary leaf contactor spring 610 causes the switch 60 to close momentarily, while the control switch 20 is closed (because the cam 314 has not yet reached the associated leaf spring 210), by forcing one contact 611 against another contact 612 to operate the buzzer 620 (FIG. 8A). The intermediate pad 613 is an insulator to maintain separation of the cantilever contactor springs 210 and 610, which, as shown in FIG. 8B are anchored in pedestals 216 and 616 in the upper wall of the receptacle.

After the momentary closure of the switch 60, the further clockwise movement of the arm 517 brings the cam 314 against the amin cantilever contactor spring 210 and thereafter opens the switch 20. The snap action of the springs 312 and 313 with respect to the boss 311 restores the toggle 310 to its original off position 310'. In the off position the hook 318' assures separation of the deactuator shaft 514 (FIG. 8A) from the controller shaft 414. It also permits manual deactuation of the unit at any time by the manual setting of the toggle 310 in the off position.

The upper part 521 of the deactuator 50 controls the time duration of the switch 20, in conjunction with the setting of the regulator 460. The latter protrudes through the front of the receptacle 101, and can be rotated to vary the settings of the regulator cams 465, 466 and 467. As shown in FIG. 8B, the cam 465 determines the time interval by limiting the extent to which the upper part 521 of the deactuator can be caused to rotate in a clockwise direction by the spring 516 at the end of the controller interval. When the hook 318 of the actuator decouples the shafts 414 and 514, the deactuator rotates until the upper projection 521 contacts a regulator lobe, such as the lobe 465. The switch duration is changed by rotating the regulator 460, which can be done while the controller 40 is in operation, by virtue of the hinge connection of the tip 521 to the remainder of the actuator at the pin 519. This connection can be of the conventional gate hinge type.

As a result, if the regulator 460 is rotated during the timing interval, the new lobe presented in the regulator position, for example, the lobe 466, merely causes the tip 521 to pivot about the pin 519 without disturbing the setting of the deactuator.

It will be apparent that numerous modifications can be made in the assemblage of FIGS. 8A and 8B. For example, the motorized controller 40 can be mounted in a frontal plate that is attached to the remainder of the receptacle, in order to limit the amount of apparatus contained in the receptacle.

Figure 9A:
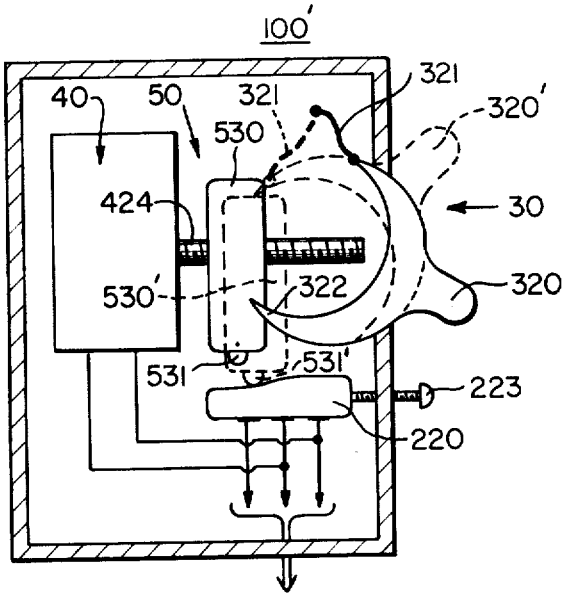
FIG. 9A is a sectional view of an alternative motor driven embodiment of the invention.

Another embodiment of the invention employing a motorized controller is illustrated in FIGS. 9A through 9D. As shown in FIG. 9A the switch unit 100' makes use of an actuator 30 with a toggle 320 that interacts with a deactuator 50 in the form of a contactor 530.

Figure 9B:
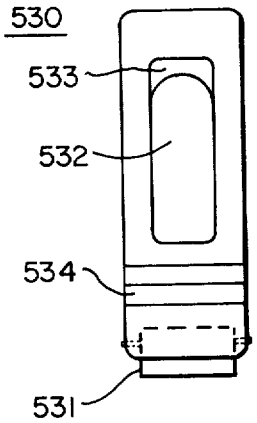
FIGS. 9B through 9D are views illustrating details of the embodiment of FIG. 9A.
Figure 9C:
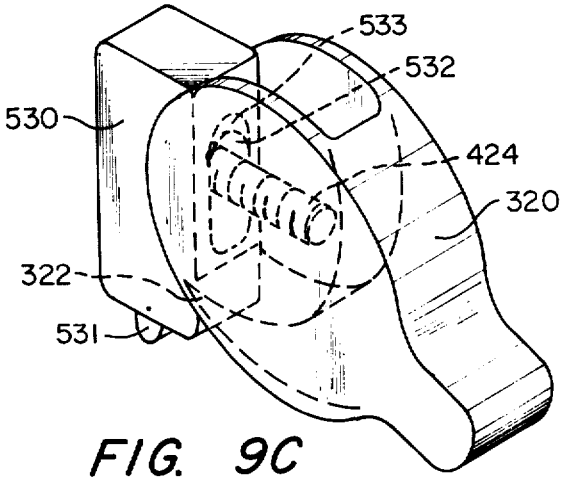

In the off position with the toggle 320 in its down position, the contactor 530, which has an elongated slot 532 as shown in FIG. 9B, is held away from the drive shaft 424 of the motorized controller 40, and also away from a slidable switch bar 220 which is able to act with a roller 531 to provide switches 20 and 60.

Figure 9D:
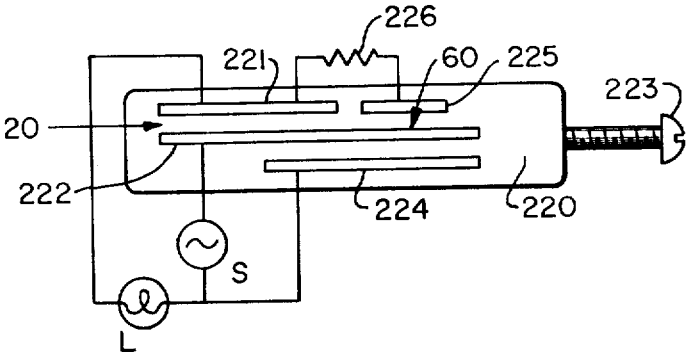

When the toggle 320 is rotated in a counterclockwise direction to the on position 320' shown in phantom, the contactor 530, whose upper position has a half thread 533 as shown in FIG. 9B, is lowered onto the threaded drive shaft 424 of the controller 40 and the roller 531 closes a circuit to a power source S as shown in FIG. 9D by shorting rails 221 and 222 of the contactor 220.

In effect, the roller 531 and the rails 221 and 222 form an auxiliary switch 20 for a device such as a light L when the regulator knob 223 is turned so that the switch bar 220 is drawn away from the controller (to the right in FIG. 9A). However, when the knob 223 is turned so that the roller 531 shorts rails 224 and 222, as well as rails 221 and 222, the controller is energized and its shaft 424 begins to rotate.

When the contactor 530 has been rotated sufficiently into the toggle 320', its snap spring 321' changes to the configuration 321, causing the tongue 322 of the toggle to enter the notch 534 of the contactor 430 and return it to its original off position. Shortly before this happens, however, the roller 531 crosses from the rail 221 shown in FIG. 9D to the rail 225, which acts with the rail 224 as a second auxiliary switch 60 and places, for example, a resistor 226 in the lighting circuit and causes a dimming of the lamp L to warn that the lamp is about to be turned off automatically.

It will be apparent that numerous modifications can be made in the circuitry of FIGS. 9A through 9D.

In general, while various aspects of the invention have been set forth by the drawings and the specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. An electrical control system, comprising a housing;

a switch actuator mounted in said housing for movement between a first position and a second position;

[an] *a first* auxiliary switch mounted in said housing for movement between a first position and a second position;

means in said housing and extendable outwardly therefrom for connecting said auxiliary switch to an energy source and a load;

means in said housing for operating said auxiliary switch in accordance with the operation of said [actuator] switch *actuator;* regulator means operable during a prescribed time interval;

means for actuating said regulator means in response to the movement of said [actuator] switch *actuator* from said first position to said second position;

restoring means for returning said [actuator] switch *actuator* from said second position to said first position;

and means responsive to said regulator means for activating said restoring means at the end of the prescribed time interval of said regulator means.

2. Apparatus as defined in claim 1, further including means *electrically associated with said first auxiliary switch and mechanically* responsive to the regulator means for operating an indicator before the end of the prescribed time interval.

3. Apparatus as defined in claim 2 wherein the indicator operating means is included in said auxiliary switch.

4. Apparatus as defined in claim 2 wherein indicator operating means is operated a plurality of times during each operating cycle.

5. Apparatus as defined in claim 2 wherein the indicator operating means includes a dimmer.

6. Apparatus as defined in claim 1 wherein said [actuating] switch *actuator* is operable during said prescribed time interval.

7. Apparatus as defined in claim 1 wherein the prescribed time interval of the regulator means is adjustable.

8. Apparatus as defined in claim 1 wherein the regulator means includes an escapement for controlling said time interval.

9. Apparatus as defined in claim 8 wherein the regulator means includes a lever arm regulated by said escapement for deactivating the [actuator] switch *actuator.*

10. Apparatus as defined in claim 1 wherein said [actuator] switch *actuator* includes a toggle which is set in its on position to actuate said regulator means and is automatically returned to its off position at the end of the prescribed time interval.

11. Apparatus as defined in claim 1 wherein the regulator means includes an electronic timer that is operated upon the closure of said [actuator] switch *actuator.*

12. Apparatus as defined in claim 11 wherein said electronic timer is a divider.

13. Apparatus as defined in claim [1] *12* wherein said divider is transformer coupled to said *auxiliary* switch.

14. Apparatus as defined in claim 11 wherein said electronic timer energizes a means for deactivating the actuating means at the end of the prescribed time interval.

15. Apparatus as defined in claim 10 further including means for locking said toggle in its on position.

*16. An electrical control system comprising*

*a housing,*

*a switch in said housing having only fully "ON" and fully "OFF" positions,*

*means in said housing for connecting said switch to a source and a load,*

*a regulator in said housing operable for a prescribed time interval,*

*means in said housing for turning said switch fully "ON" and simultaneously activating said regulator,*

*means in said housing responsive to said regulator for producing a warning, before the end of said prescribed time interval, that said switch is about to be turned fully "OFF",*

*and further means in said housing responsive to said regulator for turning said switch fully "OFF" at the end of a prescribed time interval.*

* * * * *